United States Patent
Benco et al.

(10) Patent No.: US 7,583,974 B2
(45) Date of Patent: Sep. 1, 2009

(54) SMS MESSAGING WITH SPEECH-TO-TEXT AND TEXT-TO-SPEECH CONVERSION

(75) Inventors: David S. Benco, Winfield, IL (US); Kevin J. Overend, Elmhurst, IL (US); Baoling S. Sheen, Naperville, IL (US); Sandra Lynn True, St. Charles, IL (US); Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 610 days.

(21) Appl. No.: 10/854,841

(22) Filed: May 27, 2004

(65) Prior Publication Data

US 2005/0266863 A1    Dec. 1, 2005

(51) Int. Cl.
 *G06F 15/16* (2006.01)
(52) U.S. Cl. .................... 455/466; 455/414.1
(58) Field of Classification Search .............. 455/466, 455/414.1, 412.1, 414.4; 704/235, 260; 379/88.01, 379/88.03, 88.04
See application file for complete search history.

(56) References Cited

U.S. PATENT DOCUMENTS

| | | | | |
|---|---|---|---|---|
| 5,950,123 | A * | 9/1999 | Schwelb et al. | 455/414.4 |
| 6,931,255 | B2 * | 8/2005 | Mekuria | 455/466 |
| 6,934,552 | B2 * | 8/2005 | Holley et al. | 455/466 |
| 6,990,180 | B2 * | 1/2006 | Vuori | 379/88.25 |
| 7,092,728 | B1 * | 8/2006 | Gress et al. | 455/466 |
| 2002/0069048 | A1 * | 6/2002 | Sadhwani et al. | 704/3 |
| 2003/0139922 | A1 * | 7/2003 | Hoffmann et al. | 704/201 |
| 2004/0082348 | A1 * | 4/2004 | Gabriel et al. | 455/466 |
| 2004/0176114 | A1 * | 9/2004 | Northcutt | 455/466 |
| 2004/0267527 | A1 * | 12/2004 | Creamer et al. | 704/235 |
| 2005/0075879 | A1 * | 4/2005 | Anderton | 704/260 |
| 2005/0256710 | A1 * | 11/2005 | Pankert et al. | 704/235 |

* cited by examiner

*Primary Examiner*—Sam Bhattacharya

(57) ABSTRACT

A method is provided for handling of short message service (SMS) messages for a mobile station (MS) (10) served by a wireless telecommunications network. The method includes: receiving an SMS message at the MS (10), the SMS message being a text message; alerting a user of the MS (10) that the SMS message has been received; receiving an indication that the user desires to audibly retrieve the SMS message; converting the SMS message from a text message to a corresponding verbal message; and, playing the verbal message.

5 Claims, 3 Drawing Sheets

SMS MESSAGING WITH SPEECH-TO-TEXT AND TEXT-TO-SPEECH CONVERSION

FIELD

The present inventive subject matter relates to the telecommunication arts. Particular application is found in conjunction with wireless mobile devices (e.g., mobile telephones and the like), and the specification makes particular reference thereto. However, it is to be appreciated that aspects of the present inventive subject matter are also amenable to other like applications.

BACKGROUND

Text messages, more commonly referred to as Short Message Service (SMS) messages, are known in the art of telecommunications. While generally useful for their purpose, it can at times be difficult for a user to create and manage SMS messages with their mobile station (MS), e.g., a wireless mobile telephone or other end user equipment.

An MS, such as a wireless mobile telephone, is typically equipped with a display (e.g., a liquid crystal display (LCD), a 12 button numeric keypad, and a limited number of soft and/or hard buttons. Often, a full alphabetic keyboard is not included. Accordingly, the 12 button numeric keypad is commonly used to type and/or enter text when creating an SMS message. For example, a plurality of alphabetic and/or other characters may be assigned to a single key in the keypad, and the number of times the key is pressed determines which one of the assigned characters is entered or typed.

In any event, employing a limited keypad for inputting a full set of typographical characters can be very cumbersome and time consuming, e.g., with multiple keystrokes having to be entered to type a single character. The problem is further exacerbated as the SMS message increases in size. It would be advantageous therefore to have alternate means for creating and/or managing SMS messages with an MS.

Accordingly, a new and improved SMS messaging feature is disclosed that overcomes the above-referenced problems and others.

SUMMARY

In accordance with one preferred embodiment, a method is provided for handling of short message service (SMS) messages for a mobile station (MS) served by a wireless telecommunications network. The method includes: receiving an SMS message at the MS, the SMS message being a text message; alerting a user of the MS that the SMS message has been received; receiving an indication that the user desires to audibly retrieve the SMS message; converting the SMS message from a text message to a corresponding verbal message; and, playing the verbal message.

In accordance with another preferred embodiment, a method is provided for handling SMS messages for an MS served by a wireless telecommunications network. The method includes: receiving an indication that a user of the MS desires to audibly create an SMS message, the SMS message having a body that is a text message; prompting the user to speak a verbal message; receiving the verbal message; converting the verbal message into a corresponding text message, the text message being the body of the SMS message; obtaining a destination for the SMS message; and, forwarding the SMS message to the destination over the wireless telecommunications network.

In accordance with yet another preferred embodiment, an MS is served by a wireless telecommunications network. The MS is equipped to send and receive SMS messages. The MS includes: an audio input means for receiving audible instructions from a user of the MS; and an audio output means for playing audible output from the MS to the user. The MS also has access to a voice recognition module (VRM) that selectively: (i) converts text from a SMS message received by the MS to corresponding speech upon the MS receiving a first audible instruction from the user via the audio input means, the speech being played to the user from the MS via the audio output means; and (ii) converts speech into corresponding text upon the MS receiving a second audible instruction from the user via the audio input means, the text being sent as an SMS message to a designated recipient over the wireless telecommunications network.

In accordance with still another preferred embodiment, a mobile switching center (MSC) is part of a wireless telecommunication network providing short message service (SMS) messaging for a mobile station (MS) served by the network. The MSC includes a VRM that selectively: (i) converts text from a SMS message received by the MS to corresponding speech upon the MSC receiving a first request type from the MS, the speech being forwarded from the MSC to the MS such that it can be played by the MS to a user thereof; and, (ii) converting speech received by the MSC from the MS into corresponding text upon the MSC receiving a second request type from the MS, the text being forwarded from the MSC to the MS such that it can be sent as an SMS message to a designated recipient over the wireless telecommunications network.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/ or services, and other components that are commonly known in the telecommunications art without further detailed explanation as to their configuration or operation except to the extent they have been modified or altered in accordance with and/or to accommodate the preferred embodiment(s) presented.

Figure 1:
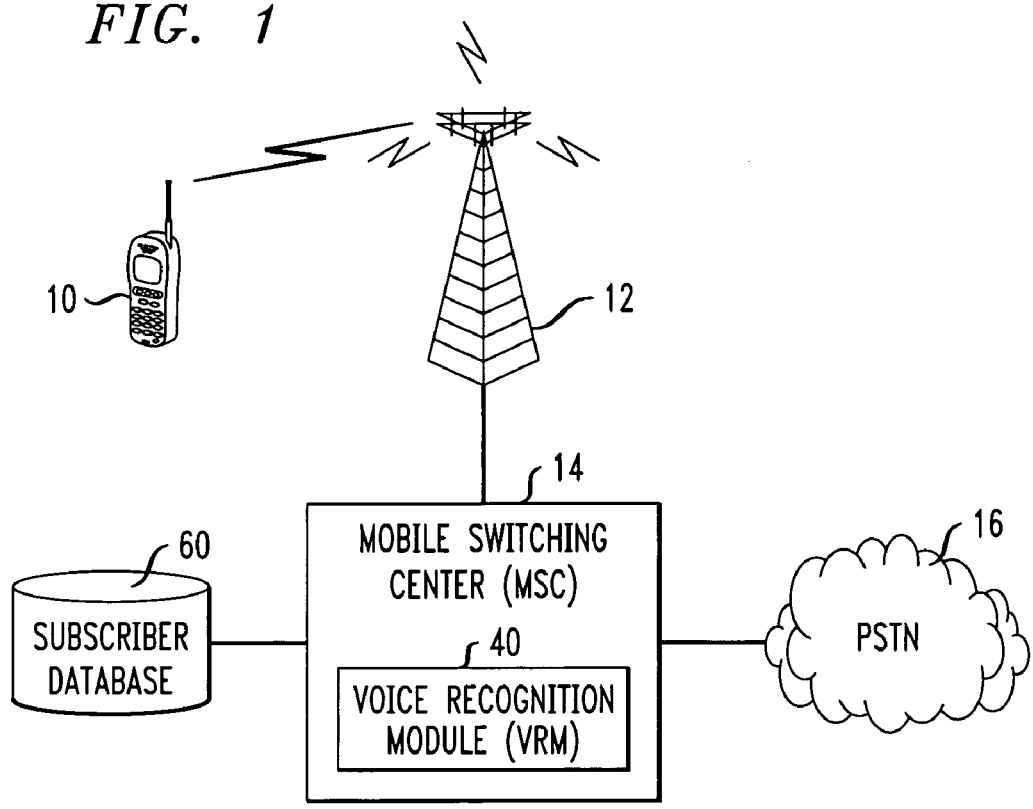
FIG. 1 is a diagrammatic illustration of an exemplary telecommunications network suitable for practicing aspects of the present inventive subject matter.

With reference to FIG. 1, an MS 10 is equipped to handle SMS messaging with a speech-to-text and/or text-to-speech feature that provides for convenient SMS message creation, retrieval and/or management. With the exception of those details noted, the MS 10 may be similar in structure and/or functionality to other appropriate MS commonly known in the art. The example embodiment described herein for illustrative purposes is a mobile wireless handset or telephone. However, it is to be appreciated that other types of MS or devices with SMS capabilities are equally suitable embodiments.

Figure 2:
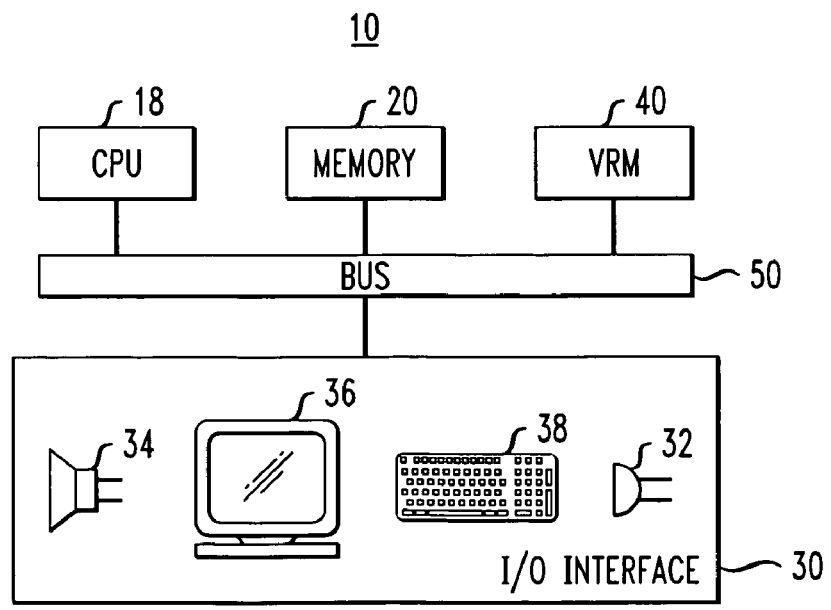
FIG. 2 is a box diagram showing an exemplary MS embodying aspects of the present inventive subject matter.

With reference to FIG. 2 and continuing reference to FIG. 1, the MS 10 (e.g., a wireless mobile telephone or other wireless mobile end user equipment) selectively connects with a wireless telecommunications network via a wireless radio frequency (RF) connection to a base station (BS) 12 served by a mobile switching center (MSC) 14 that connects to the public switched telephone network (PSTN) 16 in the usual manner. Suitably, the MS 10 is provisioned with the usual elements, e.g., a keypad with traditional numeric buttons, a number of soft and/or hard buttons, navigation buttons, etc.; a liquid crystal display (LCD) or other such display; and, other components commonly found on and/or incorporated in an MS.

As shown in FIG. 2, the MS 10 includes a central processing unit (CPU) 18 that controls and regulates operation of the MS 10. Suitably, a memory 20 stores selected data and/or information, however, another type of storage device may be employed. An input/output (I/O) interface 30 is employed for user interaction with and/or operation of the MS 10. Suitably, the interface 30 includes: a microphone 32, a speaker 34 or other audio transducer, a display 36 and a keypad 38, as is typical for a MS. In the embodiment illustrated in FIG. 2, the MS 10 is also equipped with a voice recognition module (VRM) 40, and a data bus 50 or other like data and/or signal routing device supports communication between the respective components of the MS 10. In an alternate embodiment, the VRM 40 is optionally located at the MSC 14, as shown in FIG. 1.

When the VRM 40 resides at the MSC 14, the speech-to-text and/or text-to-speech conversion of SMS messages is optionally a subscription service or feature. A user's subscription status is accordingly maintained in a subscriber database (DB) 60. Before the service or feature is administered to a user, the DB 60 is checked to see if the user requesting the service or feature does in fact subscribe to the service or feature. If so, then the service/feature is administered, otherwise if not, then the service/feature is denied.

Suitably, the VRM 40 is any standard VRM that converts verbal or spoken input into text and/or operational commands. The VRM 40 also suitably converts text input into verbal or spoken output, e.g., via a voice synthesizer or the like.

Figure 3:
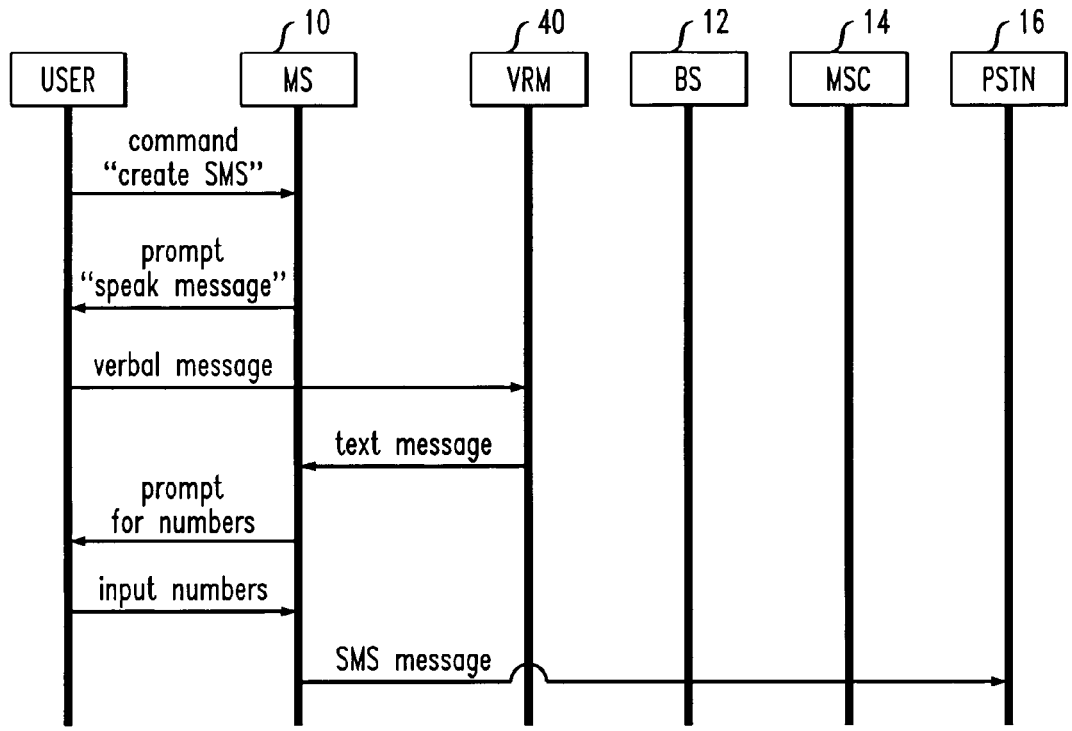
FIG. 3 is a call flow diagram showing an exemplary call flow for creating and sending an SMS message in accordance with one embodiment of the present disclosure.

With reference to FIG. 3, an exemplary call flow is shown for creating and sending an SMS message when the VRM 40 resides in the MS 10.

As shown, the user enters or inputs a command to the MS 10 to create an SMS message. Suitably, it is a verbal command, e.g., input via the microphone 32 and recognized by the VRM 40. It may however alternately be entered otherwise. In response, the MS 10 prompts the user to speak the message to be created, e.g., "after the beep." The prompt is optionally audible (e.g., via the speaker 34) and/or visual (e.g., via the display 36). When prompted, the user enters the message verbally.

The verbal message input into the MS 10 is forwarded to the VRM 40 where it is converted into corresponding text which is returned to the MS 10 as the body or content of the SMS message. The text message is optionally output on the display 36 as it is being created or shortly thereafter so that the user may review and/or edit it prior to sending.

To send the message, the MS 10 prompts the user for the telephone number(s) and/or address(es) where the text message is to be delivered. The user then enters the delivery destination or destinations. The telephone numbers/addresses are optionally entered manually via the keypad 38 or verbally. Additionally, they are optionally entered ad hoc or they may be obtained from an electronic phonebook maintained on or otherwise accessible by the MS 10. Having completed the body of the SMS message and obtained the delivery information, the MS 10 sends the message out over the PSTN 16 via the BS 12 and MSC 14 in the usual manner.

Figure 4:
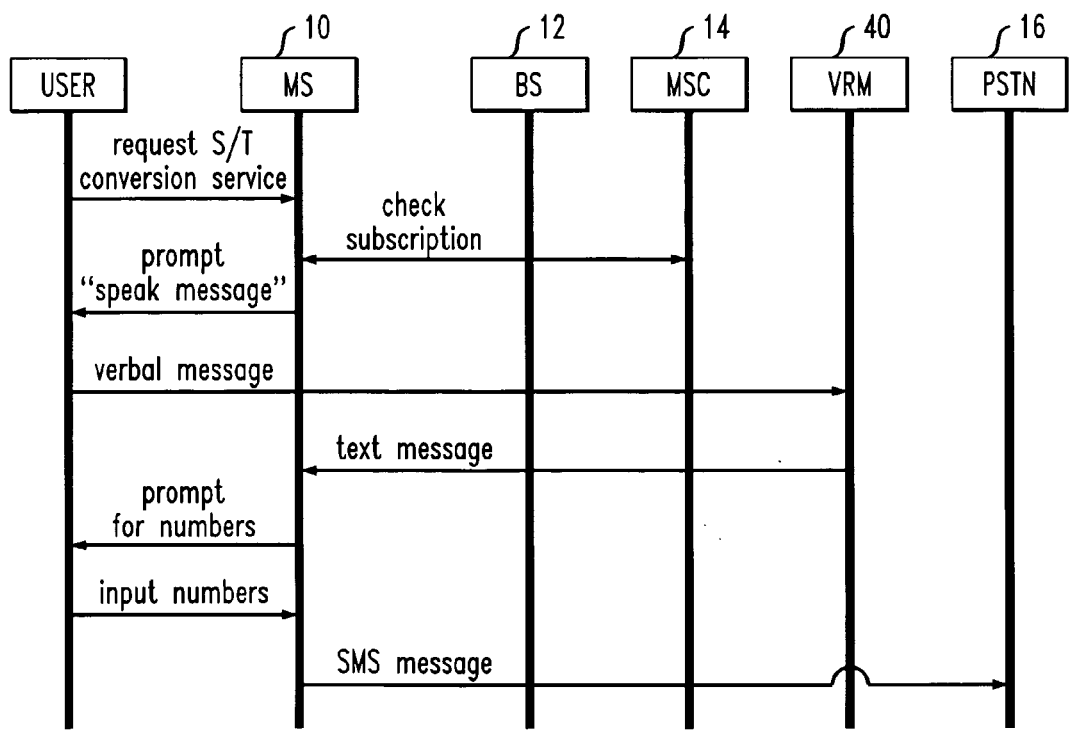
FIG. 4 is a call flow diagram showing an exemplary call flow for creating and sending an SMS message in accordance with another embodiment of the present disclosure.

With reference to FIG. 4, an exemplary call flow is shown for creating and sending an SMS message when the VRM 40 resides at the MSC 14.

As shown, the user enters or inputs a command to the MS 10 to create an SMS message using the speech-to-text (S/T) conversion feature or service. For example, the user may enter what is known as a feature code. In response, the MS 10 checks with the MSC 14 to see if the user subscribes to the feature or service. Suitably, the MSC 14 checks the DB 60 to determine the user's subscription status. Assuming it is confirmed that the user has the proper subscription to use the service, the MS 10 prompts the user to speak the message to be created, e.g., "after the beep." The prompt is optionally audible (e.g., via the speaker 34) and/or visual (e.g., via the display 36). When prompted, the user enters the message verbally.

The verbal message input into the MS 10 is forwarded to the VRM 40 (via the BS 12 and MSC 14) where it is converted into corresponding text which is returned to the MS 10 (via the MSC 14 and BS 12) as the body or content of the SMS message. Again, the text message is optionally output on the display 36 as it is being created or shortly thereafter so that the user may review and/or edit it prior to sending.

To send the message, the MS 10 prompts the user for the telephone number(s) and/or address(es) where the text message is to be delivered. The user then enters the delivery destination or destinations. Again, they are optionally entered ad hoc or they may be obtained from an electronic phonebook maintained on or otherwise accessible by the MS 10. Having completed the body of the SMS message and obtained the delivery information, the MS 10 sends the message out over the PSTN 16 via the BS 12 and MSC 14 in the usual manner.

Figure 5:
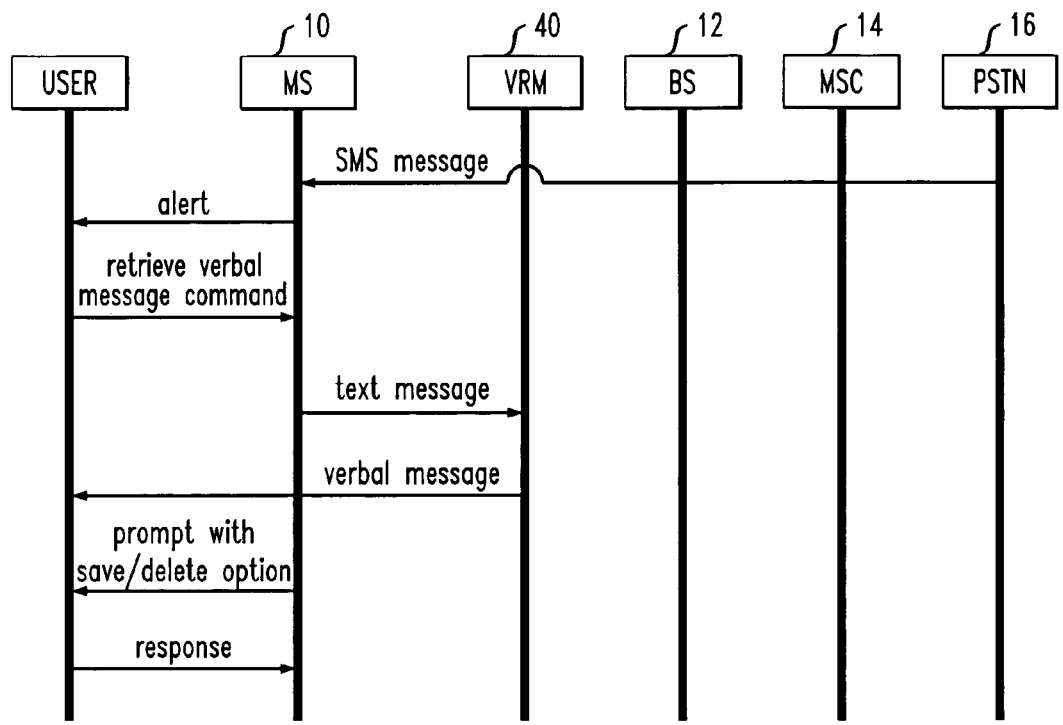
FIG. 5 is a call flow diagram showing an exemplary call flow for retrieving and managing an SMS message in accordance with one embodiment of the present disclosure.

With reference to FIG. 5, an exemplary call flow is shown for receiving and managing an SMS message when the VRM 40 resides in the MS 10.

As shown, the MS 10 receives the SMS message from the PSTN 16 via the MSC 14 and BS 12. The MS 10 in response alerts the user, e.g., by playing a ring tone through speaker 34, vibrating and/or visual displaying an indicator on the display 36. Suitably, the user selects an option on the MS 10 for audible retrieval of the otherwise text base SMS message. Suitably, the audible retrieval option is selected with a verbal command entered via the microphone 32 and recognized by the VRM 40. Alternately, the audible retrieval option is otherwise selected. Of course, the user may also be given the option to receive the text based SMS message, or receive both the audio message and the text message.

Assuming an audible message retrieval is selected, the MS 10 forwards the SMS message to the VRM 40 that converts the text to speech. The spoken message is suitably played back to the user via the MS 10, e.g., via the speaker 34. If text retrieval is also selected, then the SMS message is also shown on the display 36.

After the message is delivered, the MS 10 optionally prompts the user with management options, e.g., saving or deleting the message. The management prompt is suitably an audio prompt, a visual prompt or both. The user optionally responses to the prompt with a verbal command that is spoken into the microphone 32 and recognized by the VRM 40, e.g., "save message" or "delete message." Alternately, the response is otherwise entered. In either case, the MS 10 obeys the command accordingly.

Figure 6:
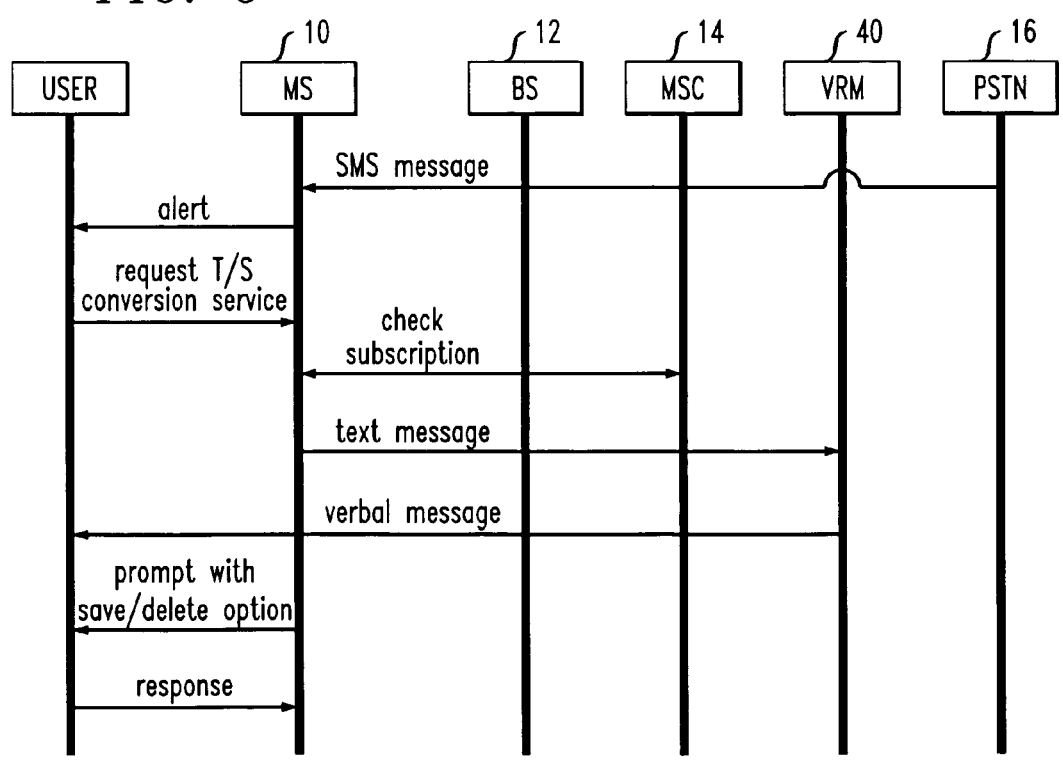
FIG. 6 is a call flow diagram showing an exemplary call flow for retrieving and managing an SMS message in accordance with another embodiment of the present disclosure.

With reference to FIG. 6, an exemplary call flow is shown for receiving and managing an SMS message when the VRM 40 resides at the MSC 14.

As shown, the MS 10 receives the SMS message from the PSTN 16 via the MSC 14 and BS 12. The MS 10 in response alerts the user, e.g., by playing a ring tone through speaker 34, vibrating and/or visual displaying an indicator on the display 36. The user selects an option on the MS 10 to request the text-to-speech (T/S) feature or service for audible retrieval of the otherwise text base SMS message. For example, the user may enter what is known as a feature code. Of course, the user may still be given the option to receive the text based SMS message, or optionally receive both the audio message and the text message.

In response to the text-to-speech service request, suitably, the MS 10 checks with the MSC 14 to see if the user subscribes to the feature or service. Suitably, the MSC 14 checks the DB 60 to determine the user's subscription status. Assuming it is confirmed that the user has the proper subscription to use the service, the MS 10 forwards the SMS message to the VRM 40 (via the BS 12 and MSC 14) wherein it is converted into corresponding speech which is returned to the MS 10 (via the MSC 14 and BS 12). The spoken message is suitably played back to the user via the MS 10, e.g., via the speaker 34. If text retrieval is also selected, then the SMS message is also shown on the display 36.

Again, after the message is delivered, the MS 10 optionally prompts the user with management options, e.g., saving or deleting the message. Upon appropriate entry of the desired response, the MS 10 obeys the command accordingly.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of handling short message service (SMS) messages for a mobile station (MS) served by a wireless telecommunications network, said method comprising:
   (a) receiving an SMS message at the MS, said SMS message being a text message;
   (b) alerting a user of the MS that the SMS message has been received;
   (c) receiving an indication supplied by the user sent from the MS to a mobile switching station (MSC) that the user desires to audibly retrieve the SMS message;
   (d) converting the SMS message from a text message to a corresponding verbal message; and
   (e) playing the verbal message.

2. The method of claim 1, wherein step (d) is carried out at a mobile switching center (MSC) which is part of the wireless telecommunications network and serves the MS.

3. The method of claim 2, wherein a subscription status of the user is checked prior to step (d), such that steps (d) and (e) are omitted unless the user subscribes to a service supporting steps (d) and (e).

4. The method of claim 1, wherein the indication received in step (c) is a verbal input from the user entered into the MS.

5. A mobile switching center (MSC) within a wireless telecommunication network providing short message service (SMS) messaging for a mobile station (MS) served by the network, said MSC comprising:
   a voice recognition module (VRM), said VRM selectively:
      (i) converting text from a SMS message received by the MS to corresponding speech upon the MSC receiving a first request type from the MS, said speech being forwarded from the MSC to the MS such that it can be played by the MS to a user thereof; and,
      (ii) converting speech received by the MSC from the MS into corresponding text upon the MSC receiving a second request type from the MS, said text being forwarded from the MSC to the MS such that it can be sent as an SMS message to a designated recipient over the wireless telecommunications network.

* * * * *

UNITED STATES PATENT AND TRADEMARK OFFICE
CERTIFICATE OF CORRECTION

PATENT NO. : 7,583,974 B2  Page 1 of 1
APPLICATION NO. : 10/854841
DATED : September 1, 2009
INVENTOR(S) : Benco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Fourteenth Day of September, 2010

David J. Kappos
*Director of the United States Patent and Trademark Office*